United States Patent [19]
Kondo

[11] Patent Number: 6,037,970
[45] Date of Patent: *Mar. 14, 2000

[54] VIDEOCONFERENCE SYSTEM AND METHOD THEREFOR

[75] Inventor: Tetsujiro Kondo, Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/832,152

[22] Filed: Apr. 2, 1997

[30] Foreign Application Priority Data

Apr. 5, 1996 [JP] Japan ................................ 8-083433

[51] Int. Cl.⁷ ...................................................... H04N 7/14
[52] U.S. Cl. ............................ 348/15; 348/17; 379/93.21
[58] Field of Search ................................. 348/14, 15, 16, 348/17, 18; 370/260; 345/330; 709/204

[56] References Cited

U.S. PATENT DOCUMENTS

| | | | |
|---|---|---|---|
| 4,400,724 | 8/1983 | Fields ........................................ | 348/15 |
| 4,890,314 | 12/1989 | Judd et al. ................................ | 348/14 |
| 5,365,265 | 11/1994 | Shibata et al. ............................ | 348/14 |
| 5,500,671 | 3/1996 | Andersson et al. ....................... | 348/15 |
| 5,612,733 | 3/1997 | Flohr ........................................ | 348/14 |

*Primary Examiner*—Curtis A. Kuntz
*Assistant Examiner*—Melur Ramakrishnaiah
*Attorney, Agent, or Firm*—Frommer, Lawrence & Haug, LLP.; William S. Frommer

[57] ABSTRACT

A videoconference system holds a videoconference among N (a plurality of) communication centers connected by a communication line. Each communication center includes: N-1 display devices for displaying images from the other communication centers participating in the videoconference; N-1 speaker devices for outputting voices from the other communication centers participating in the videoconference; N-1 camera devices disposed at positions corresponding to the display devices, for imaging participants in the videoconference; N-1 microphone devices disposed at positions corresponding to the display devices, for capturing voices from the participants; and a transmitter/receiver transmitting output signals from the N-1 camera devices and output signals from the N-1 microphone devices to the other communication centers, and receiving output signals from the camera devices and output signals from the microphone devices of the other N-1 communication centers, the transmitter/receiver for supplying the output signals from the camera devices and the output signals from the microphone devices of the other N-1 communication centers to the N-1 display devices and the N-1 speaker devices corresponding to the camera devices and the microphone devices.

13 Claims, 6 Drawing Sheets

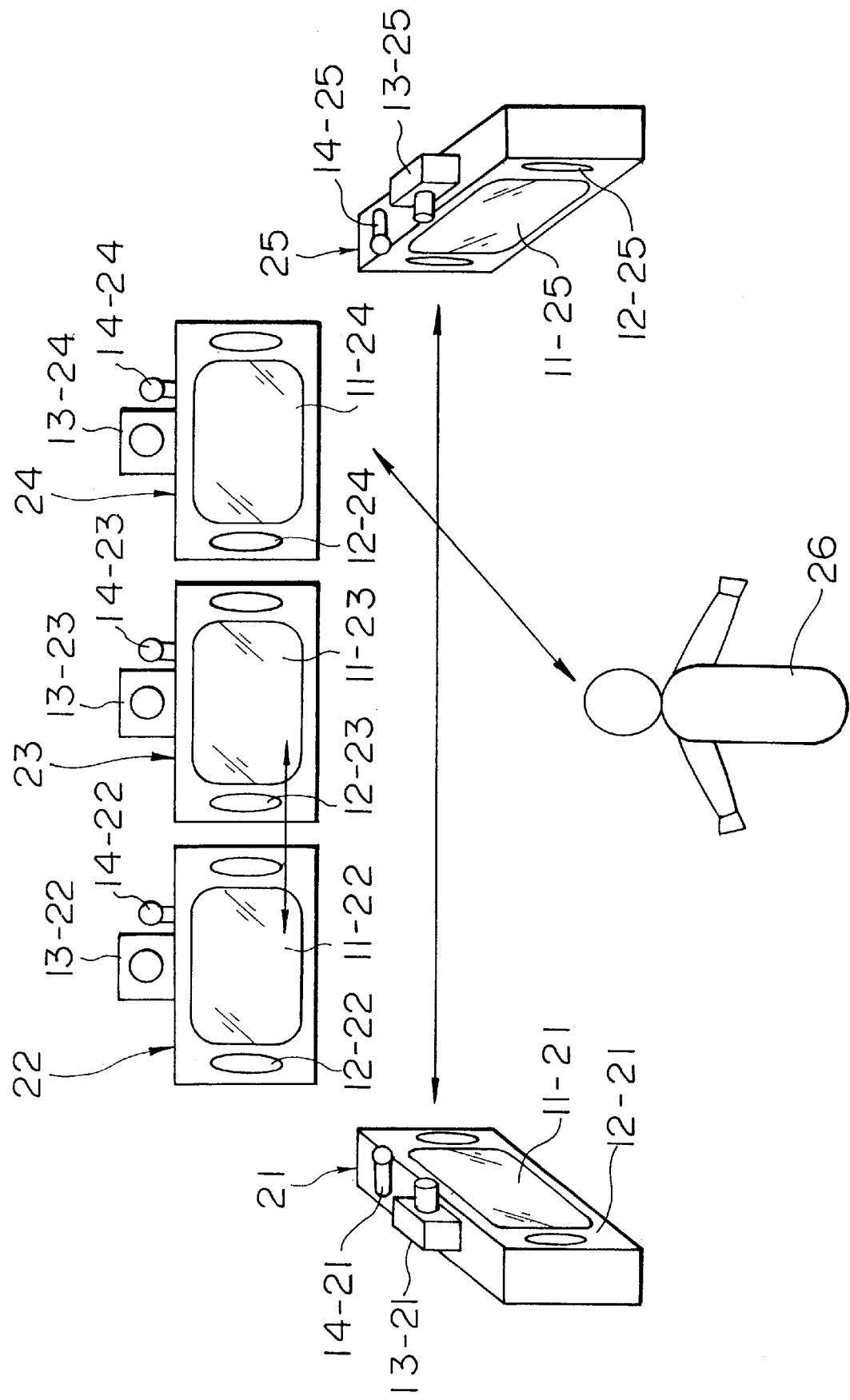

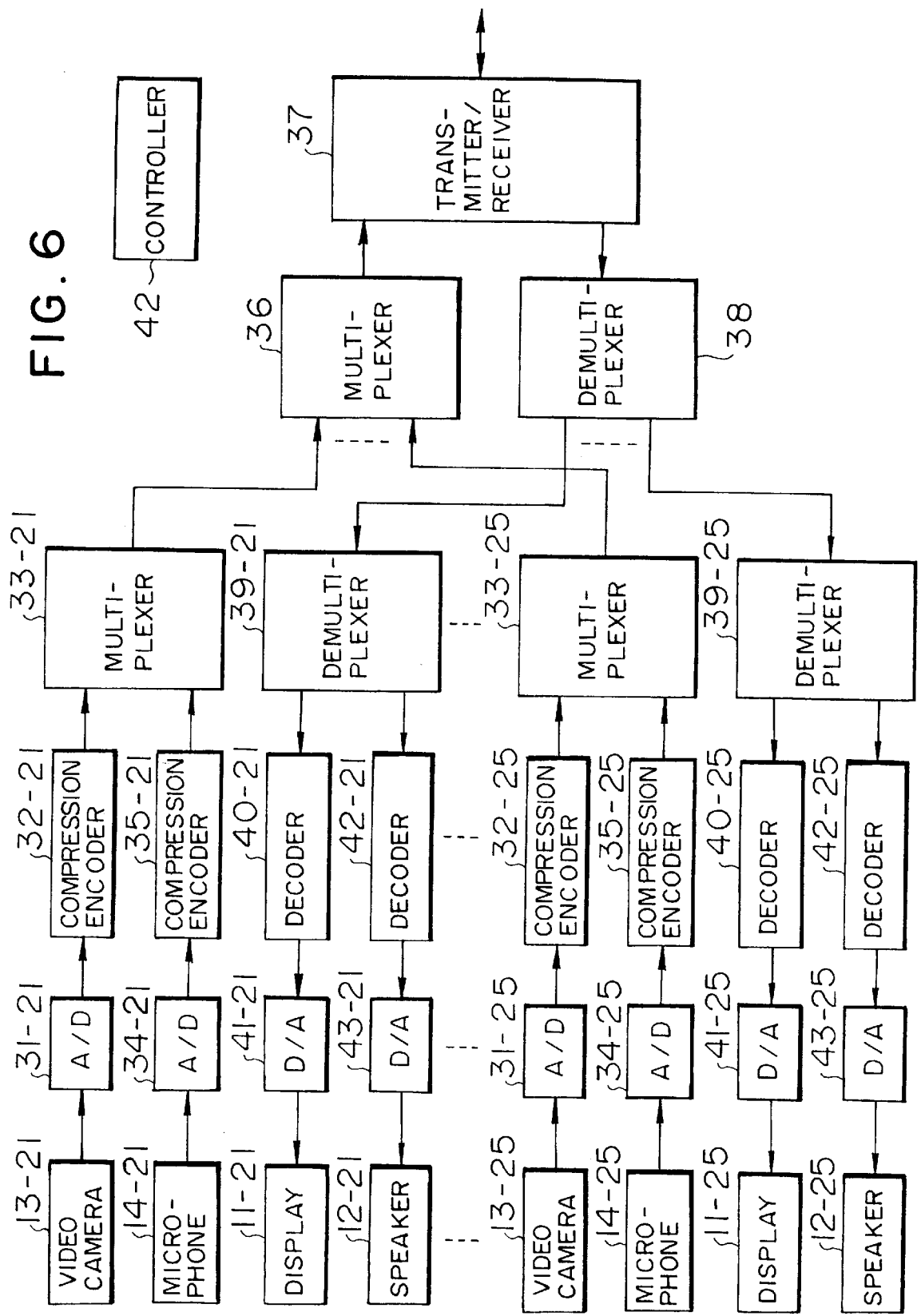

VIDEOCONFERENCE SYSTEM AND METHOD THEREFOR

BACKGROUND OF THE INVENTION

1. Field of the Invention

The present invention relates to videoconference systems and methods therefor, and in particular to a videoconference system and a method therefor in which a videoconference can be held with the illusion of a physical conference.

2. Description of the Related Art

FIG. 1 shows an example of a conventional videoconference system, which consists of four communication centers 51-1 to 51-4 mutually connected via a network 56. The communication center 51-1 is provided with a display 52-1 which displays an image corresponding to a video signal transmitted from any one of the other communication centers 51-2 to 51-4, and a speaker 53-1 which outputs a voice signal corresponding to the displayed image. A video camera 54-1 images a predetermined participant at the conference, and a microphone 55-1 captures speech of the participant. The imaged video signal and the captured voice signal are transmitted to the other communication centers 51-2 to 51-4 via the network 56. The other communication centers 51-2 to 51-4 have the same structure.

Each predetermined communication center is constructed as shown in FIG. 2. For example, in the communication center 51-4, the video camera 54-4 images a participant 61-4 at the videoconference, while the microphone 55-4 captures speech of the participant 61-4. The display 52-4 displays the image corresponding to any one of video signals transmitted from the other communication centers 51-1 to 51-3 via the network 56, while the speaker 53-4 outputs the voice signal corresponding to the video signal. Accordingly, the participant 61-4 can view another participant at one of the other communication centers, and can hear the speech of the participant.

In the above manner a plurality of participants can hold a videoconference via the network 56 without time delay even when they are in remote places.

However, according to the conventional video conference system, for example, while the participant 61-4 at the communication center 51-4 is speaking, the video signal and voice signal from the participant 61-4 are transmitted to the other communication centers 51-1 to 51-3 via the network 56, so that the image corresponding to the video signal and the speech corresponding to the voice signal from the participant 61-4 are outputted from the displays 52-1 to 52-3 and the speakers 53-1 to 53-3 of the communication centers 51-1 to 51-3. Consequently, all the participants at the communication centers 51-1 to 51-3 can simultaneously view the image of the participant at the communication center 51-4 and hear the speech of the participant.

As a result, the participants 61-1 to 61-3 at the communication centers 51-1 and 51-3 recognize that the participant 61-4 at the communication center 51-4 speaks to all of them. Accordingly, each time the participant 61-4 wants to send a message to one participant among the participants 61-1 to 61-3, the participant 61-4 must specify to whom the speech is directed, which causes a problem in that a conference cannot be held naturally.

SUMMARY OF THE INVENTION

In view of the above-described circumstances the present invention has been made. Accordingly, it is an object of the present invention to provide a videoconference system and a method therefor in which a conference can naturally be held with the illusion of a physical conference.

According to a first aspect of the present invention, the foregoing object is achieved through the provision of a videoconference system for holding a videoconference among N (a plurality of) communication centers connected by a communication line, each communication center including: N-1 display devices for displaying images from the other communication centers participating in the videoconference; N-1 speaker devices for outputting voices from the other communication centers participating in the videoconference; N-1 camera devices disposed at positions corresponding to the display devices, for imaging participants in the videoconference; N-1 microphone devices disposed at positions corresponding to the display devices, for capturing voices from the participants; and a transmitter/receiver transmitting output signals from the N-1 camera devices and output signals from the N-1 microphone devices to the other communication centers, and receiving output signals from the camera devices and output signals from the microphone devices of the other N-1 communication centers, the transmitter/receiver for supplying the output signals from the camera devices and the output signals from the microphone devices of the other N-1 communication centers, all connected to one communication center, to the N-1 display devices and the N-1 speaker devices corresponding to the camera devices and the microphone devices.

Preferably, each communication center includes: a first encoder for encoding the output signal from the camera device by a predetermined first encoding method; a second encoder for encoding the output signal from the microphone device by a predetermined second encoding method; a first decoder for decoding the output signals from the camera devices of the other communication centers, the output signals from the camera devices being encoded by the predetermined first encoding method; and a second decoder for decoding the output signals from the microphone devices of the other communication centers, the output signals from the microphone devices being encoded by the predetermined second encoding method.

According to a second aspect of the present invention, the foregoing object is achieved through the provision of a method for holding a videoconference among N (a plurality of) communication centers connected by a communication line, each communication center executing the steps of: displaying images from the other communication centers participating in the videoconference on N-1 display devices; outputting voices from the other communication centers participating in the videoconference to N-1 speaker devices; imaging participants in the videoconference with N-1 camera devices disposed at positions corresponding to the N-1 display devices; capturing voices from the participants with N-1 microphone devices disposed at positions corresponding to the N-1 display devices; and transmitting output signals from the N-1 camera devices and output signals from the N-1 microphone devices to the other communication centers, and receiving output signals from the camera devices and output signals from the microphone devices of the other N-1 communication centers, thereby supplying the output signals from the camera devices and the output signals from the display devices of the other N-1 communication centers, all connected to one communication center, to the N-1 display devices and the N-1 speaker devices corresponding to the camera devices and the microphone devices.

Preferably, each communication center further executes the steps of: encoding the output signal from the camera device by a predetermined first encoding method; encoding the output signal from the microphone device by a predetermined second encoding method; decoding the output signals from the camera devices of the other communication centers, the output signals from the camera devices being encoded by the predetermined first encoding method; and decoding the output signals from the microphone devices of the other communication centers, the output signals from the microphone devices being encoded by the predetermined second encoding method.

According to a third aspect of the present invention, the foregoing object is achieved through the provision of a plurality of (N) communication centers connected by a communication line for holding a videoconference among the communication centers, each communication center including: N-1 display devices for displaying images from the other communication centers participating in the videoconference; N-1 speaker devices for outputting voices from the other communication centers participating in the videoconference; N-1 camera devices disposed at positions corresponding to the display devices, for imaging participants in the videoconference; N-1 microphone devices disposed at positions corresponding to the display devices, for capturing voices from the participants; and a transmitter/receiver transmitting output signals from the N-1 camera devices and output signals from the N-1 microphone devices to the other communication centers, and receiving output signals from the camera devices and output signals from the microphone devices of the other N-1 communication centers, the transmitter/receiver for supplying the output signals from the camera devices and the output signals from the microphone devices of the other N-1 communication centers, all connected to one communication center, to the N-1 display devices and the N-1 speaker devices corresponding to the camera devices and the microphone devices.

Preferably, each communication center includes: a first encoder for encoding the output signal from the camera device by a predetermined first encoding method; a second encoder for encoding the output signal from the microphone device by a predetermined second encoding method; a first decoder for decoding the output signals from the camera devices of the other communication centers, the output signals from the camera devices being encoded by the predetermined first encoding method; and a second decoder for decoding the output signals from the microphone devices of the other communication centers, the output signals from the microphone devices being encoded by the predetermined second encoding method.

In the videoconference system according to the first aspect, the method according to the second aspect and the plurality of communication centers according to the third aspect, the N-1 display devices, the N-1 speaker devices, the N-1 camera devices, and the N-1 microphone devices may be disposed at predetermined positions, respectively, and the N-1 camera devices may image the participants at different angles. The N-1 microphone devices may be directional.

BRIEF DESCRIPTION OF THE DRAWINGS

FIG. 5 is a schematic chart showing a configuration of displays disposed in each communication center shown in FIG. 3.

FIG. 6 is a block diagram showing all the communication centers shown in FIG. 3.

DESCRIPTION OF THE PREFERRED EMBODIMENT

Figure 1:
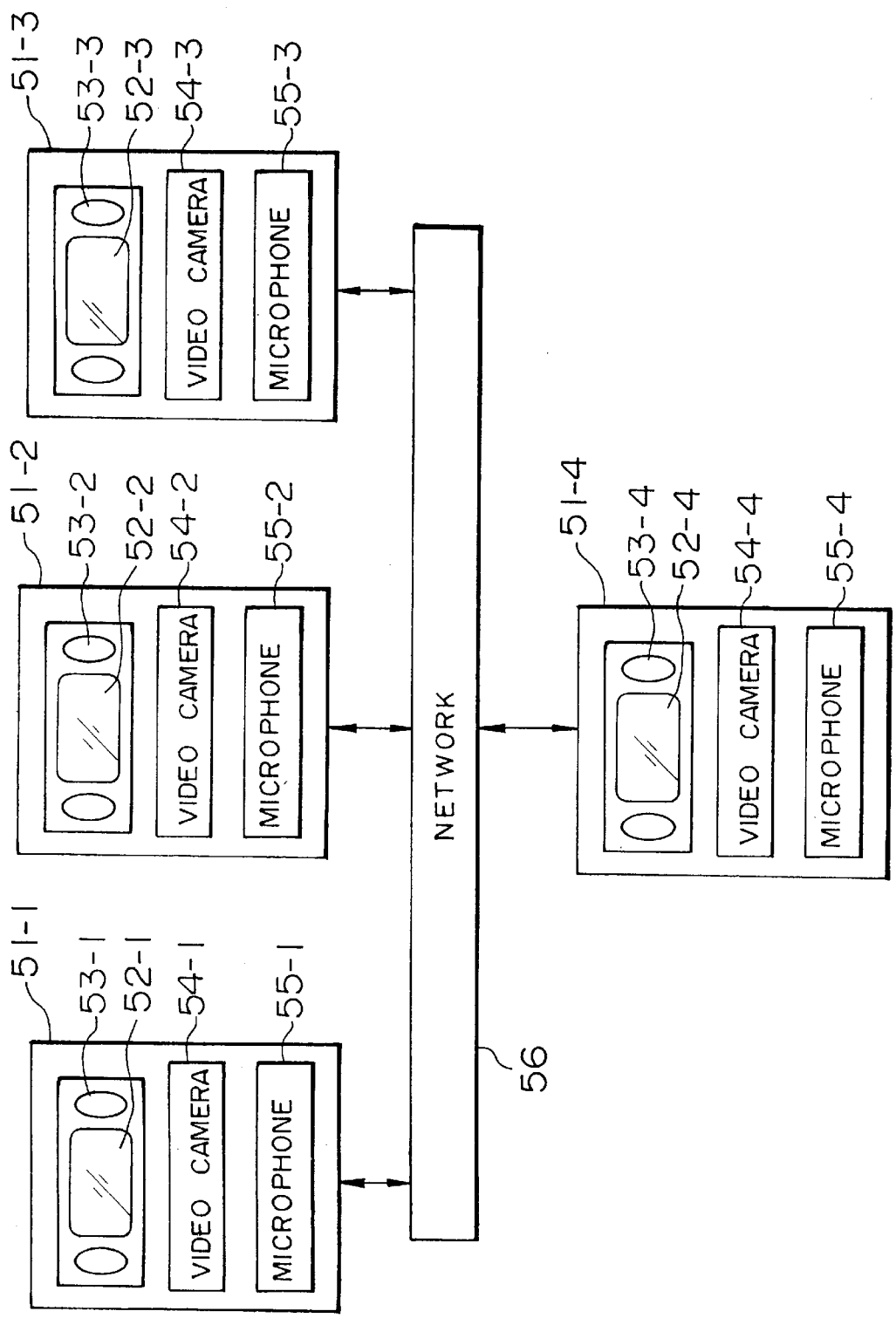
FIG. 1 is a block diagram showing an example of a conventional videoconference system.
Figure 2:
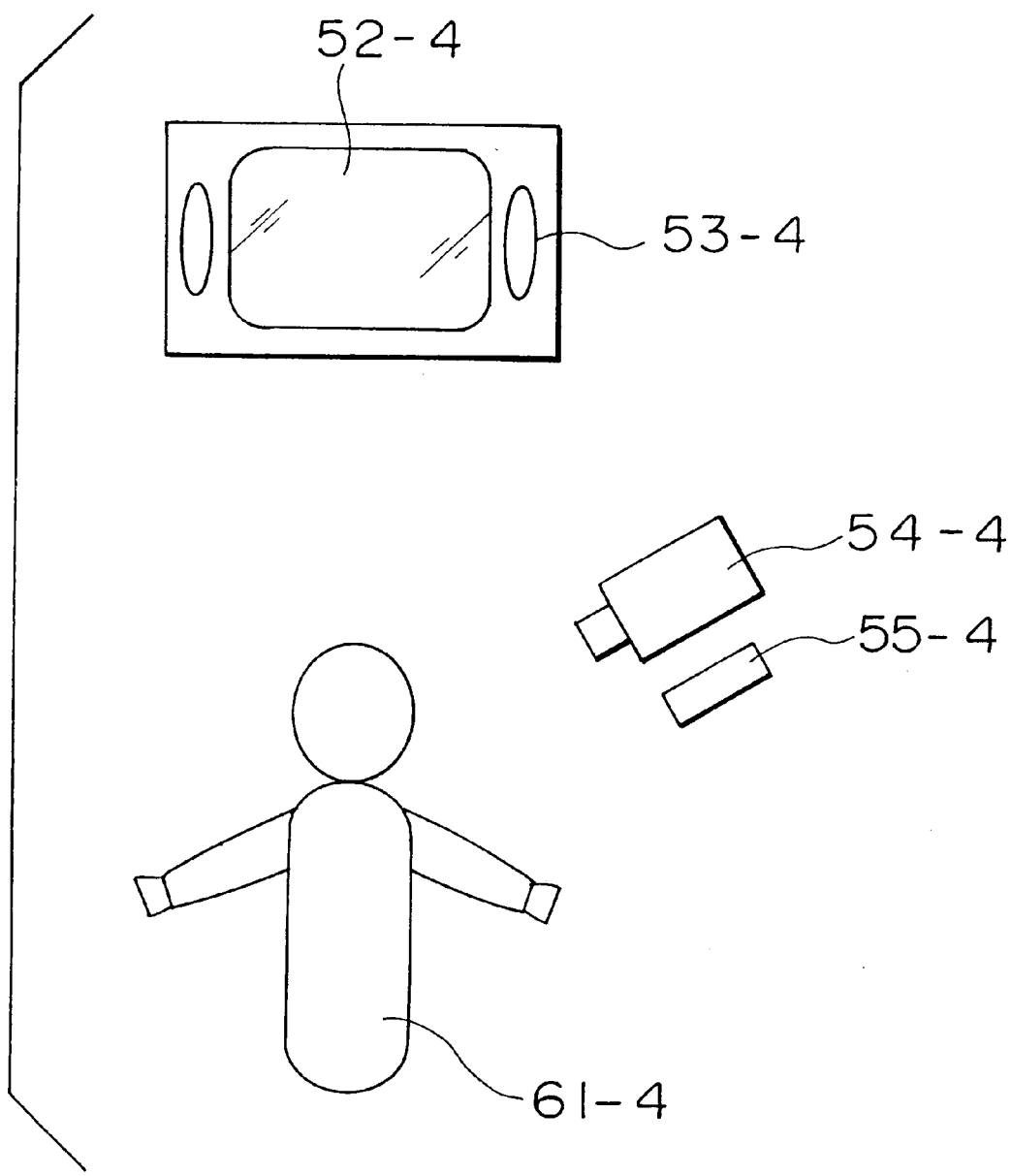
FIG. 2 is a configuration chart showing a communication center 51-4 shown in FIG. 1.
Figure 3:
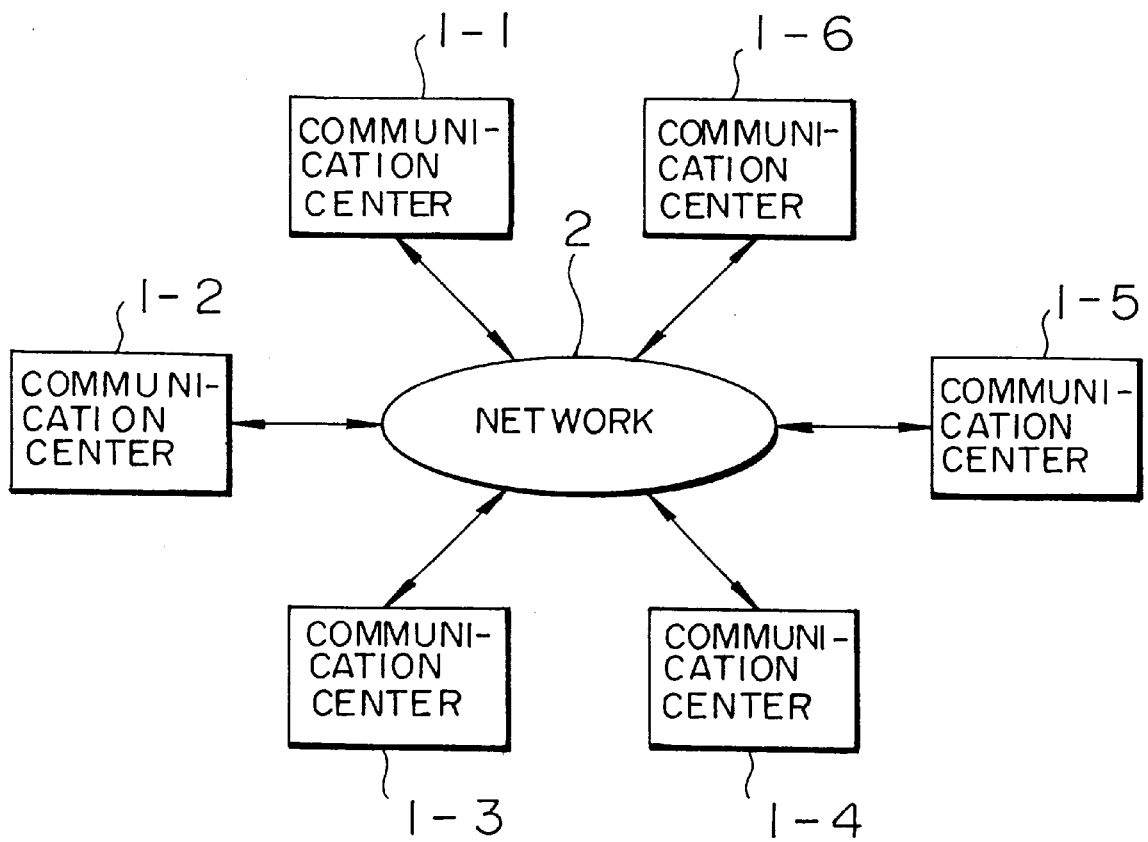
FIG. 3 is a block diagram showing a videoconference system according to an embodiment of the present invention.

FIG. 3 shows an entire videoconference system according to an embodiment of the present invention. The videoconference system consists of a plurality of (in this embodiment six) communication centers 1-1 to 1-6 which are mutually connected via a network 2 such as the ISDN (integrated services digital network). Each communication center includes, for example, one conference room.

Figure 4:
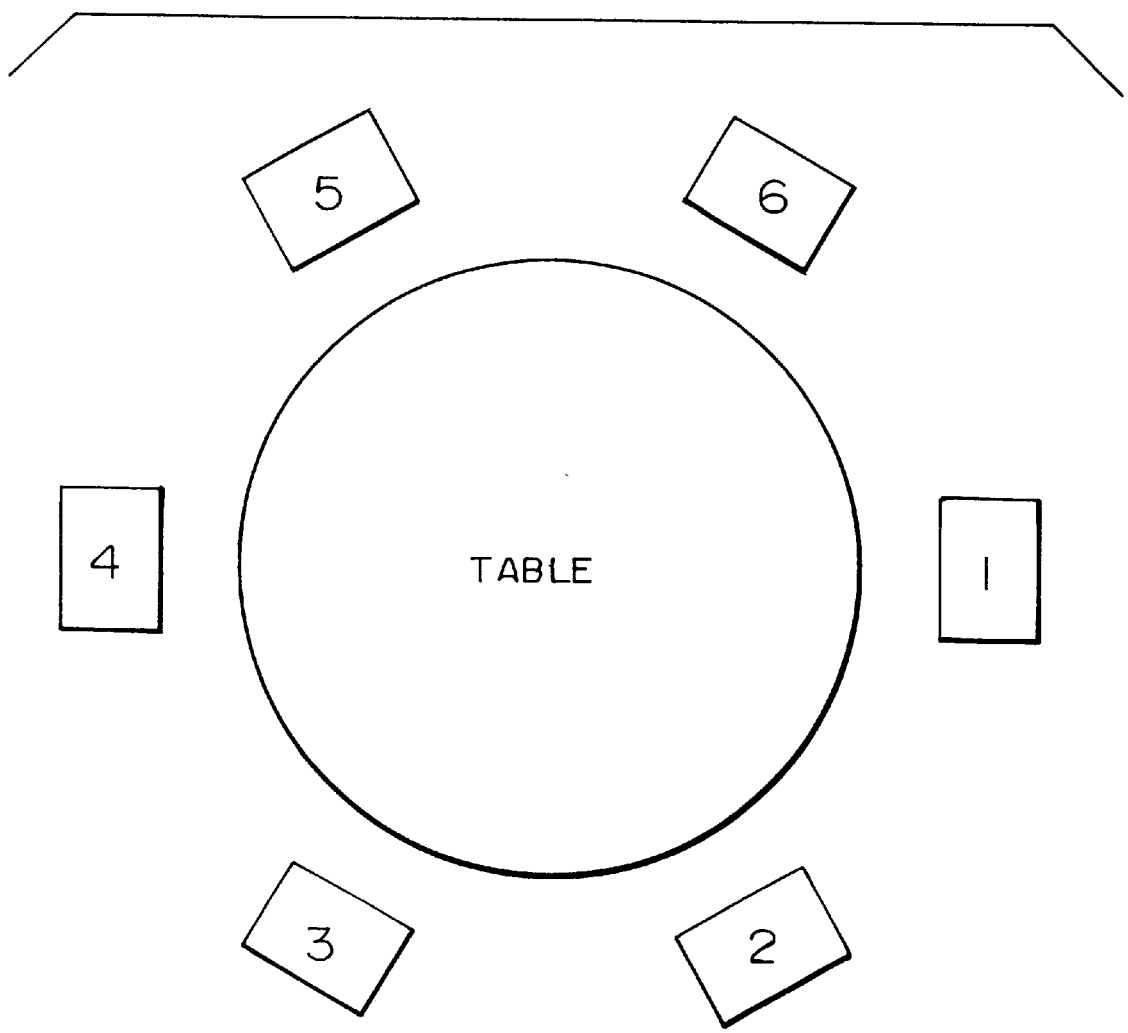
FIG. 4 is a plan view illustrating the conference room of each communication center used in the video conference system according to the embodiment of the present invention.

Referring to FIG. 4, each conference room contains, for example, one table, one chair, and five displays. For example, the conference room of the communication center 1-6 contains a chair disposed at position 6 and displays disposed at positions 1 to 5. The conference room of the communication center 1-5 contains a chair disposed at position 5 and displays disposed at positions 1 to 4 and 6. The conference room of the communication center 1-4 contains a chair disposed at position 4 and displays disposed at positions 1 to 3, 5 and 6. The conference room of the communication center 1-3 contains a chair disposed at position 3 and displays disposed at positions 1, 2 and 4 to 6. The conference room of the communication center 1-2 contains a chair disposed at position 2 and displays disposed at positions 1 and 3 to 6. The conference room of the communication center 1-1 contains a chair disposed at position 1 and displays disposed at positions 2 to 6.

Among the displays disposed in the conference room of the communication center 1-6, the display at position 1 displays an image of the participant at the communication center 1-1, the display at position 2 displays an image of the participant at the communication center 1-2, the display at position 3 displays an image of the participant at the communication center 1-3, the display at position 4 displays an image of the participant at the communication center 1-4, and the display at position 5 displays an image of the participant at the communication center 1-5. At the other communication centers the displays at positions excluding a position for the chair for the participant similarly display the imaged participants at the corresponding communication centers.

As described above, in each communication center the chair on which the participant sits and the displays for displaying the participants at the other communication centers are disposed. Consequently, by structuring the conference rooms in this manner, the conference room in each communication center has the same configuration for the participants, whose images are all projected on the displays except for an image of the participant at the communication center. Thus, the same conditions for the conference are realized.

By referring to FIG. 5, details of each communication center will be described below.

Since each communication center has almost the same structure except for a slightly different configuration of displays, only the communication center 1-6 will be described, and description of the other communication centers 1-1 to 1-5 will be omitted.

As shown in FIG. 4, in the conference room of the communication center 1-6, one chair is disposed at position 6, and five displays are disposed at positions 1 to 5.

Accordingly, a participant 26 shown in FIG. 5 sits on the chair at position 6 shown in FIG. 4. Displays 21 to 25 are provided with display screens 11-21 to 11-25 for displaying video signals supplied from the other communication centers, speakers 12-21 to 12-25 for outputting voice signals corresponding to the video signals, video cameras 13-21 to 13-25 for imaging the participant 26 in the conference room, and microphones 14-21 to 14-25 for capturing speech of the participant 26.

The display screens 11-21 to 11-25 output images corresponding to the video signals transmitted from the communication centers 1-1 to 1-5, and the speakers 12-21 to 12-25 output the voice signals corresponding to the transmitted video signals. In other words, an image of the participant at the communication center 1-1 is projected on the display screen 11-21 of the display 21, and speech of the participant is outputted from the speaker 12-21. An image of the participant at the communication center 1-2 is projected on the display screen 11-22 of the display 22, and speech of the participant is outputted from the speaker 12-22. An image of the participant at the communication center 1-3 is projected on the display screen 11-23 of the display 23, and speech of the participant is outputted from the speaker 12-23. An image of the participant at the communication center 1-4 is projected on the display screen 11-24 of the display 24, and speech of the participant is outputted from the speaker 12-24. An image of the participant at the communication center 1-5 is projected on the display screen 11-25 of the display 25, and speech of the participant is outputted from the speaker 12-25. In each display the display screen and the speaker are disposed so as be mutually close (opposed).

The video camera 13-21 mounted to the display 21 images the participant 26 at the communication center 1-6, the microphone 14-21 captures the speech of the participant 26, and the video signal and the voice signal from the participant 26 are supplied to the communication center 1-1. The video camera 13-22 mounted to the display 22 images the participant 26 at the communication center 1-6, the microphone 14-22 captures the speech of the participant 26, and the video signal and the voice signal from the participant 26 are supplied to the communication center 1-2. The video camera 13-23 mounted to the display 23 images the participant 26 at the communication center 1-6, the microphone 14-23 captures the speech of the participant 26, and the video signal and the voice signal from the participant 26 are supplied to the communication center 1-3. The video camera 13-24 mounted to the display 24 images the participant 26 at the communication center 1-6, the microphone 14-24 captures the speech of the participant 26, and the video signal and the voice signal from the participant 26 are supplied to the communication center 1-4. The video camera 13-25 mounted to the display 25 images the participant 26 at the communication center 1-6, the microphone 14-25 captures the speech of the participant 26, and the video signal and the voice signal from the participant 26 are supplied to the communication center 1-5. In each display the video camera and the microphone are disposed so as to correspond to (in proximity to) the display screen and the speaker.

The microphones 14-21 to 14-25 of the displays 21 to 25 comprise directional microphones, which are designed to capture the speech of the participant 26. In order to photograph the participant 26, the video cameras 13-21 to 13-25 of the displays 21 to 25 are disposed so as to be directed to the participant 26. In this arrangement the video cameras 13-21 to 13-25 photograph the participant 26 at different angles. In other words, a front view of the participant is imaged by the video camera 13-23 of the display 23, a front left view of the participant is imaged by the video camera 13-22 of the display 22, and a front right view of the participant is imaged by the video camera 13-24 of the display 24. At the same time, a left side view of the participant is imaged by the video camera 13-21 of the display 21, a right side view of the participant is imaged by the video camera 13-25 of the display 25.

As shown in FIG. 5, the displays 21 to 25 are disposed at predetermined positions shown in FIG. 4 so that the participant 26 can watch the display screens 11-21 to 11-25 of the displays 21 to 25.

By referring to FIG. 6, an example of each communication center will be described. Since each communication center has almost the same construction, only the communication center 1-1 will be explained, and description of the other communication centers will be omitted.

As shown in FIG. 6, a video signal from the video camera 13-21 is supplied to an analog-to-digital converter (shown as A/D) 31-21. The analog-to-digital converter 31-21 performs the analog-to-digital conversion of the video signal, and supplies the output data to a compression encoder 32-21. The compression encoder 32-21 performs compression encoding of the inputted data by using, for example, a hybrid encoding method employing DCT (discrete cosine transformation) and motion compensation encoding, and supplies the compressed video data as output data to a multiplexer 33-21. The compression encoding method is not limited to the hybrid encoding method employing DCT and motion compensation encoding. Wavelet transformation or another encoding technique may be used.

At the same time, a voice signal from the microphone 14-21 is supplied to an analog-to-digital converter 34-21. The analog-to-digital converter 34-21 performs the analog-to-digital conversion of the voice signal, and supplies the output signal to a compression encoder 35-21. The compression encoder 35-21 performs compression encoding of the inputted data by using, for example, ADPCM (adaptive differential pulse code modulation) or SB-ADPCM (sub-band adaptive differential pulse code modulation), and supplies the compressed voice data as output data to the multiplexer 33-21. The compression encoding method is not limited to ADPCM and SB-ADPCM. Another encoding method may be used.

A multiplexer 33-21 combines the compressed image data supplied from the compression encoder 32-21 and the compressed voice data supplied from the compression encoder 35-21, and supplies the combined data to a multiplexer 36.

Video signals from the video cameras 13-22 to 13-25 and voice signals from the microphones 14-22 to 14-25 are processed similar to the video signal from the video camera 13-21 and the voice signal from the microphone 14-21. Respective combined data from multiplexers 33-22 to 33-25 are supplied to the multiplexer 36.

The multiplexer 36 combines five combined data (composed of compressed video data and compressed voice data) for five channels supplied from the multiplexers 33-21 to 33-25, and outputs the combined data as an output signal to a transmitter/receiver 37. When the multiplexer 36 combines the combined data from the respective channels, it converts the combined data from the channels into packet data of predetermined size, which are supplied to the transmitter/receiver 37 by time divisional multiplexing. Each packet data is provided with identification as header information representing the channel through which the data has traveled.

The (packet) transmitter/receiver 37 transmits the data supplied from the multiplexer 36 to the communication centers 1-1 to 1-5 via the network 2.

The transmitter/receiver 37 also receives data transmitted from the communication centers 1-1 to 1-5, and supplies the received data to a demultiplexer 38. The demultiplexer 38 receives the supplied, received data, and separates the time divisional multiplexed packet data transmitted from the communication centers 1-1 to 1-5 into corresponding packet data. The demultiplexer 38 detects the identification as header information of the packet data to extract only the packet data corresponding to the communication center 1-6, and supplies the packet data to one of demultiplexers 39-21 to 39-25, on the channel corresponding to the identification of the packet data.

The demultiplexer 39-21 separates packet data supplied from the demultiplexer 38 into compressed video data and compressed voice data, and supplies the compressed video data and the compressed voice data to a decoder 40-21 and a decoder 42-21, respectively. With respect to the compressed video data, the decoder 40-21 executes a reverse process (decoding process) corresponding to the same compression encoding process used when the compression encoding of the video data is performed, and supplies the output signal to a digital-to-analog converter (shown as D/A) 41-21. The digital-to-analog converter 41-21 performs the digital-to-analog conversion of the inputted signal, and supplies the decoded video signal to the display screen 11-21. With respect to the compressed voice data, the decoder 42-21 executes a reverse process (decoding process) corresponding to the same compression encoding process used when the compression encoding of the voice data is performed, and supplies the output signal to a digital-to-analog converter (shown as A/D) 43-21. The digital-to-analog converter 43-21 performs the digital-to-analog conversion of the inputted signal, and supplies the decoded voice signal to the speaker 12-21.

Also the output data from demultiplexers 39-21 to 39-25 are processed similar to the output data from the demultiplexer 39-21. The video signals and the voice signals are supplied to the display screens and the speakers, respectively.

The communication center 1-6 further includes a controller 42, which controls each component (control lines are not shown).

The operation of each communication center will be described. Since each communication center has almost the same structure, only the communication center 1-6 will be explained, and description of the communication centers 1-1 to 1-5 will be omitted.

At the communication center 1-6 the participant 26 is imaged by the video camera 13-21. As shown in FIG. 5, the video camera 13-21 disposed to the left of the participant 26 captures a left view of the participant 26. The video signal from the video camera 13-21 is supplied to the analog-to-digital converter 31-21. The analog-to-digital converter 31-21 performs the analog-to-digital conversion of the video signal, and supplies the output signal to the compression encoder 32-21. The compression encoder 32-21 performs compression encoding of the inputted signal by the predetermined method.

The microphone 14-21 captures the speech of the participant 26. A voice signal form the microphone 14-21 is supplied to the analog-to-digital converter 34-21. The analog-to-digital converter 34-21 performs the analog-to-digital conversion of the voice signal, and supplies the output signal to the compression encode 35-21. The compression encoder 35-21 performs compression encoding of the inputted signal by a predetermined method.

The multiplexer 33-21 combines the compressed video data supplied from the compression encoder 32-21 and the compressed voice data supplied from the compression encoder 35-21, and supplies the combined data to the multiplexer 36.

The same process as described above is performed with respect to signals captured by the video cameras 13-22 to 13-25 and the microphones 14-22 to 14-25. As shown in FIG. 5, the video cameras 13-22 to 13-25 and the microphones 14-22 to 14-25 are sequentially disposed from the left to the right of the participant 26, thus, images and voices of the participant 26 are captured from the different positions corresponding to the arrangement.

The multiplexer 36 performs the packet time divisional multiplexing of the combined data (composed of compressed video data and compressed voice data) for five channels supplied from the multiplexers 33-1 to 33-5, and supplies the output data to the transmitter/receiver 37. At this time each packet is provided with the identification of each channel as header information. The output data from the transmitter/receiver 37 is transmitted to the other communication centers via the network 2. In other words, the video data captured by the video camera 13-21 and the voice data captured by the microphone 14-21 are used in the communication center 1-1, the video data captured by the video camera 13-22 and the voice data captured by the microphone 14-22 are used in the communication center 1-2, and the video data captured by the video camera 13-23 and the voice data captured by the microphone 14-23 are used in the communication center 1-3. Similarly, the video data captured by the video camera 13-24 and the voice data captured by the microphone 14-24 are used in the communication center 1-4, and the video data captured by the video camera 13-25 and the voice data captured by the microphone 14-25 are used in the communication center 1-5.

The transmitter/receiver 37 receives the time divisional multiplexed packet data (video data and voice data) transmitted from the communication centers 1-1 to 1-5, and supplies the received data to the demultiplexer 38. The demultiplexer 38 separates the time divisional multiplexed packet data into corresponding packet data. The demultiplexer 38 detects the identification as header information of the packet data to extract only the packet data corresponding to the communication center 1-6, and supplies the packet data to one of demultiplexers 39-21 to 39-25, on the channel corresponding to the identification of the packet data.

The demultiplexer 39-21 separates the combined data into compressed video data and compressed voice data, and supplies the compressed video data and the compressed voice data to the decoders 40-21 and 42-21, respectively. The decoder 40-21 decodes the compressed video data, and supplies the output data to the digital-to-analog converter 41-21. The digital-to-analog converter 41-21 performs the digital-to-analog conversion of the inputted data, and supplies the converted data as video signal to the display screen 11-21, on which an image is projected. The decoder 42-21 decodes the compressed voice data, and supplies the output data to the digital-to-analog converter 43-21. The digital-to-analog converter 43-21 performs the digital-to-analog conversion of the inputted voice data, and supplies the converted data as a voice signal to the speaker 12-21, from which voice is outputted.

Consequently, the image and voice of the participant at the communication center 1-1 are outputted from the display screen 11-21 and the speaker 12-21. Similarly, the images and voices of the participants at the communication centers 1-2 to 1-5 are outputted from the display screens 11-22 to 11-25 and the speaker 12-22 to 12-25.

As shown in FIGS. 4 and 5, the display screen 11-21 to 11-25 and the corresponding speakers 12-21 to 12-25 are disposed at different spatial positions around the participant 26. Images of the participants at the communication centers 1-1 to 1-5 are projected on the display screens. Accordingly, for example, the participant 26 is able to speak as if the participant 26 participated in a conference with the other five participants around one table.

In other words, for example, when the participant 26 wants to speak, in particular to the participant at the communication center 1-1, the participant 26 speaks while looking at the display screen 11-21 on which is an image of the participant at the communication center 1-1. At this time, the video camera 13-21 captures a front image of the participant 26. Since the microphone 14-21 is directional, it can capture a higher level voice signal, compared with the other microphones 14-22 to 14-25. Consequently, the display disposed in the communication center 1-1, corresponding to the communication center 1-6, displays a front image of the participant 26, and the corresponding speaker outputs a high level voice. In this manner the participant at the communication center 1-1 can intuitively recognize that he/she is being spoken to by the participant 26 at the communication 1-6.

To the contrary, when the participant 26 speaks to the display screen 11-21, profiles of the participant are photographed at respective angles by the other video cameras 13-22 to 13-25. At the same time, the voice of the participant 26 is captured at lower levels by the microphones 14-22 to 14-25 than at the level of the microphone 14-21. The images and voice captured by the video cameras 13-22 to 13-25 and microphones 14-22 to 14-25 are outputted from the display screens and speakers of the communication centers 1-2 to 1-5, corresponding to the communication center 1-6. Thus, by watching the display screens, the participants 1-2 to 1-5 can recognize that the participant 26 is speaking to a different participant.

As described above, the videoconference system according to the present invention makes it possible to hold a conference with the illusion that the six participants are holding a physical conference.

A method for connecting each communication center to the network, used for holding a videoconference, will be described. Before the video conference is held, the six communication centers 1-1 to 1-6 are not mutually active. When the conference room light of one communication center among the six communication centers provided with the videoconference system is initially switched on by one participant, connection commands are transmitted from the communication center. In other words, for example, when the participant 26 has switched on the conference room light of the communication center 1-6 before the other participants, the controller 42 in the communication center 1-6 synchronizes with the switching on of the light, and transmits a connection command to each communication center. The controllers in the other communication centers 1-1 to 1-5 receive the communication commands, so that connection among the communication centers is completed. As described above, the connection commands are transmitted synchronized with the switching on of the light. However, for example, the transmission may be synchronized with the timing of when the first participant opens the conference room door, timing of when the first participant sits on a seat, or timing of when the first participant switches on the power to the videoconference system. Otherwise, by using other methods, the connection commands may be transmitted.

A method for holding a videoconference when all the participants of the six communication centers are present has been described. When the participant at the communication center 1-4 is absent, a video signal representing the condition of absence is projected on the display screen of the display corresponding to the communication center 1-4 in each communication center.

Although a videoconference system using six communication centers has been described, the present invention is not limited to six communication centers and the number of communication centers may be increased or decreased.

As seen in the foregoing description, according to a videoconference system and a method therefor of the present invention, N-1 images and N-1 voices are transmitted to the corresponding communication centers from one communication center, and N-1 images and N-1 voices from the other communication centers are respectively received, whereby a natural conference with the illusion of physical presence can be held.

Various modifications and applications of the present invention may be made within the spirit and scope thereof. Therefore, the scope of the present invention is not limited to the above embodiment.

What is claimed is:

1. A videoconference system for holding a videoconference among N communication centers connected by a communication line, each communication center comprising:

N-1 display devices for displaying images from the other communication centers participating in said videoconference;

N-1 speaker devices for outputting voices from the other communication centers participating in said videoconference;

N-1 camera devices disposed at positions corresponding to said display devices, for imaging participants in said videoconference;

N-1 microphone devices disposed at positions corresponding to said display devices, for capturing voices from said participants;

N-1 first multiplexers for combining video and audio signals from said camera and microphone devices to respectively produce N-1 first multiplexed outputs;

a second multiplexer for multiplexing the first N-1 multiplexed outputs to produce a second multiplexed output;

a transmitter/receiver for receiving said second multiplexed output and for transmitting a signal to said communication line, the transmitted signal including video and audio signals from the N-1 camera devices and the N-1 microphone devices, the transmitter/receiver receiving the transmitted signal to extract the video and audio signals corresponding to other communication centers and outputting the extracted video and audio signals;

a first demultiplexer for demultiplexing the output from the transmitter/receiver and for outputting respective multiplexed outputs; and N-1 second demultiplexers for respectively receiving the multiplexed outputs from said first demultiplexer and for separating video and audio signals received by said transmitter/receiver and for supplying the separated video and audio signals to the respective N-1 display and N-1 speaker devices.

2. A videoconference system according to claim 1, wherein said N-1 display devices, said N-1 speaker devices, said N-1 camera devices, and said N-1 microphone devices are disposed at predetermined positions, respectively, and said N-1 camera devices image said participants at different angles.

3. A videoconference system according to claim 2, wherein said N-1 microphone devices are directional.

4. A videoconference system according to claim 3, wherein each communication center includes:
   a first encoder for encoding the output signal from said camera device by a predetermined first encoding method;
   a second encoder for encoding the output signal from said microphone device by a predetermined second encoding method;
   a first decoder for decoding the output signals from said camera devices of the other communication centers, the output signals from said camera devices being encoded by said predetermined first encoding method;
   and a second decoder for decoding the output signals from said microphone devices of the other communication centers, the output signals from said microphone devices being encoded by said predetermined second encoding method.

5. A method for holding a videoconference among N communication centers connected by a communication line, comprising the steps of:
   displaying images from the other communication centers participating in said videoconference on N-1 display devices located at a given communication center;
   outputting voices from the other communication centers participating in said videoconference to N-1 speaker devices located at said given communication center;
   imaging participants in said videoconference with N-1 camera devices disposed at said given communication center at positions corresponding to said N-1 display devices;
   capturing voices from said participants with N-1 microphone devices disposed at said given communication center at positions corresponding to said N-1 display devices;
   multiplexing video and audio signals from said camera and microphone devices to produce N-1 first multiplexed outputs;
   multiplexing the N-1 first multiplexed outputs and producing a second multiplexed output;
   transmitting the second multiplexed output to said communication line, the transmitted second multiplexed output including video and audio signals from the N-1 camera devices and the N-1 microphone devices, receiving a transmitted signal to extract the video and audio signals of other communication centers and outputting the extracted video and audio signals;
   demultiplexing the extracted video and audio signals and outputting multiplexed outputs; and
   demultiplexing the multiplexed outputs to recover the video and audio signals to be supplied to the N-1 display devices and the N-1 speaker devices.

6. A method according to claim 5, wherein said N-1 display devices, said N-1 speaker devices, said N-1 camera devices, and said N-1 microphone devices are disposed at predetermined positions, respectively, and said N-1 camera devices image said participants at different angles.

7. A method according to claim 6, wherein said N-1 microphone devices are directional.

8. A method according to claim 7, wherein said communication center further executes the steps of:
   encoding the output signal from said camera device by a predetermined first encoding method;
   encoding the output signal from said microphone device by a predetermined second encoding method;
   decoding the output signals from said camera devices of the other communication centers, the output signals from said camera devices being encoded by said predetermined first encoding method;
   and decoding the output signals from said microphone devices of the other communication centers, the output signals from said microphone devices being encoded by said predetermined second encoding method.

9. A plurality of communication centers connected by a communication line for holding a videoconference among said communication centers, each communication center comprising:
   N-1 display devices for displaying images from the other communication centers participating in said videoconference;
   N-1 speaker devices for outputting voices from the other communication centers participating in said videoconference;
   N-1 camera devices disposed at positions corresponding to said display devices, for imaging participants in said videoconference;
   N-1 microphone devices disposed at positions corresponding to said display devices, for capturing voices from said participants;
   N-1 first multiplexers for combining video and audio signals from said camera and microphone devices to respectively produce first multiplexed outputs;
   a second multiplexer for multiplexing the first N-1 multiplexed outputs to produce a second multiplexed output;
   a transmitter/receiver for receiving said second multiplexed output and for transmitting a signal to said communication line, the transmitted signal including video and audio signals from the N-1 camera devices and the N-1 microphone devices, the transmitter/receiver receiving the transmitted signal to extract the video and audio signals corresponding to other communication centers and outputting the extracted video and audio signals;
   a first demultiplexer for demultiplexing the output from the transmitter/receiver and for outputting respective multiplexed outputs; and
   N-1 second demultiplexers for respectively receiving the multiplexed outputs from said first demultiplexer and for separating video and audio signals received by said transmitter/receiver and for supplying the separated video and audio signals to the respective N-1 display and N-1 speaker devices.

10. A plurality of (N) communication centers connected by a communication line for holding a videoconference among said communication centers, according to claim 9, wherein said N-1 display devices, said N-1 speaker devices, said N-1 camera devices, and said N-1 microphone devices are disposed at predetermined positions, respectively, and said N-1 camera devices image said participants at different angles.

11. A plurality of (N) communication centers connected by a communication line for holding a videoconference among said communication centers, according to claim 10, wherein said N-1 microphone devices are directional.

12. A plurality of (N) communication centers connected by a communication line for holding a videoconference among said communication centers, according to claim 11, wherein each communication center includes:

a first encoder for encoding the output signal from said camera device by a predetermined first encoding method;

a second encoder for encoding the output signal from said microphone device by a predetermined second encoding method;

a first decoder for decoding the output signals from said camera devices of the other communication centers, the output signals from said camera devices being encoded by said predetermined first encoding method;

and a second decoder for decoding the output signals from said microphone devices of the other communication centers, the output signals from said microphone devices being encoded by said predetermined second encoding method.

13. A videoconference system for holding a videoconference among N communication centers connected by a communication line, each communication center comprising:

N-1 display devices for displaying images from the other communication centers participating in said videoconference;

N-1 speaker devices for outputting voices from the other communication centers participating in said videoconference;

N-1 camera devices disposed at positions corresponding to said display devices, for imaging participants in said videoconference;

N-1 microphone devices disposed at positions corresponding to said display devices, for capturing voices from said participants;

a multiplexer for generating a combined video and audio signal which includes ID signals respectively identifying a respective camera and microphone device for each channel from the N-1 camera devices and N-1 microphone devices;

a transmitter/receiver for transmitting a signal to said communication line, the transmitted signal including video and audio signals from the N-1 camera devices and the N-1 microphone devices, the transmitter/receiver receiving the transmitted signal to extract the video and audio signals corresponding to other communication centers and outputting the extracted video and audio signals;

a demultiplexer coupled to said communication line for separating the output from the transmitter/receiver based upon the ID signals and for supplying each separated video and audio signals to a corresponding display device and speaker device among said N-1 display devices and said N-1 speaker devices based upon the ID signals.

* * * * *